C. E. HAYNES.
Harness-Snap.

No. 160,266.

Patented March 2, 1875.

WITNESSES.
F. Hannewell
W. E. Boardman

C. E. Haynes.
F. Curtis. Atty.

THE GRAPHIC CO. PHOTO-LITH. 39 & 41 PARK PLACE, N.Y.

UNITED STATES PATENT OFFICE.

CORNELIUS E. HAYNES, OF BOSTON, MASSACHUSETTS, ASSIGNOR TO CHARLES W. SABIN AND AUGUSTUS PAGE, OF SAME PLACE.

IMPROVEMENT IN HARNESS-SNAPS.

Specification forming part of Letters Patent No. 160,266, dated March 2, 1875; application filed February 2, 1875.

*To all whom it may concern:*

Figure 1:
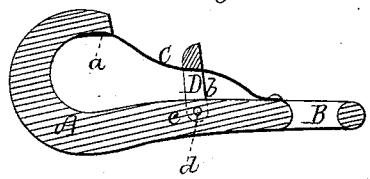
Figure 2:
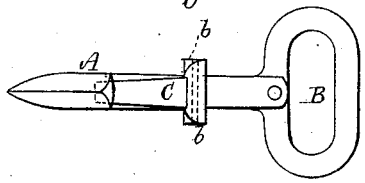
Figure 3:
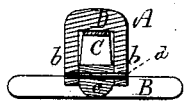
Figure 4:
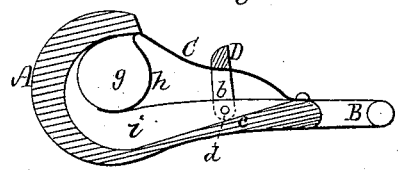

Be it known that I, CORNELIUS E. HAYNES, of Boston, Suffolk county, Massachusetts, have invented an Improvement in Harness-Snaps, of which the following is a specification:

The drawings accompanying this specification represent, in Figure 1, a longitudinal section, in Fig. 2 an edge view, and in Fig. 3 a transverse section, of a harness snap or hook embodying my improvements. Fig. 4 is a longitudinal section of a snap representing a modified form of construction.

In these drawings, A represents a snap or hook, composed of metal, and provided with an eye, B, at one extremity, by which it is to be attached to a chain or strap after the manner of harness-snaps now in general use, by which to confine dogs, hitch horses, and various other purposes. The spring or dog which closes the open portion of the hook is shown at C as applied in the usual manner, except that a shallow pocket or inclosure, a, is formed in the face of the beak of the hook, to receive the free end of said spring, and prevent contact of the latter with any object which would be liable to break or injure it. D, in the drawings, represents a thumb-latch, which is in the form of a yoke or forked plate, the arms b b of which straddle the shank c of the hook, and are confined to the latter by a rivet, d, which passes through the whole, the upper portion of such latch abutting, or practically so, against the upper surface of the spring C. The purpose of the thumb-latch D is to provide a ready and easy means of pressing inward the spring C, and releasing the hook from the object to which it is attached. A modification of my invention is shown in Fig. 4 of the accompanying drawings, in which the spring C is represented as terminating in a semi-annular bend, h, whose convexity is the obverse of that of the hook A, in order to create a circular inclosure or eye, g, to receive the ring or other object to which the catch is temporarily confined. The bend h serves a very useful purpose in many instances, in preventing the ring or other object to which the hook is hitched from slipping up and becoming jammed between the spring C and the shank c, which otherwise might ensue, and render the device inoperative.

The shank of the hook should be channeled or grooved, as shown at i in Fig. 4, to receive the bend h when the spring is forced inward.

I claim—

The combination, with the hook A and spring C, of the thumb-latch D, substantially as and for the purposes stated.

CORNELIUS E. HAYNES.

Witnesses:
F. CURTIS,
W. E. BOARDMAN.